US009322438B2

(12) United States Patent  
Verhoog et al.

(10) Patent No.: US 9,322,438 B2  
(45) Date of Patent: Apr. 26, 2016

(54) TORSION-DAMPING DEVICE COMPRISING TWO TORQUE OUTPUT PLATES ARRANGED ON EITHER SIDE OF TORQUE INPUT RING

(71) Applicant: VALEO EMBRAYAGES, Amiens (FR)

(72) Inventors: Roel Verhoog, Gournay sur Aronde (FR); Maryse Soirant, Rivery (FR); Thomas David, Hazebrouck (FR)

(73) Assignee: Valeo Embrayages (FR)

( * ) Notice: Subject to any disclaimer, the term of this patent is extended or adjusted under 35 U.S.C. 154(b) by 1 day.

(21) Appl. No.: 14/379,225

(22) PCT Filed: Feb. 12, 2013

(86) PCT No.: PCT/FR2013/050281  
§ 371 (c)(1),  
(2) Date: Aug. 15, 2014

(87) PCT Pub. No.: WO2013/121137  
PCT Pub. Date: Aug. 22, 2013

(65) Prior Publication Data  
US 2015/0024854 A1  Jan. 22, 2015

(30) Foreign Application Priority Data  
Feb. 16, 2012 (FR) ...................... 12 51410

(51) Int. Cl.  
*F16D 3/14* (2006.01)  
*F16D 3/12* (2006.01)  
*F16F 15/123* (2006.01)  
*F16F 15/14* (2006.01)  
*F16H 45/02* (2006.01)

(52) U.S. Cl.  
CPC .. *F16D 3/12* (2013.01); *F16D 3/14* (2013.01); *F16F 15/12373* (2013.01); *F16F 15/145* (2013.01); *F16H 2045/0231* (2013.01); *F16H 2045/0263* (2013.01)

(58) Field of Classification Search  
CPC ............ F16D 3/12; F16D 3/14; F16F 15/145; F16F 15/12373; F16H 2045/0263; F16H 2045/0231  
USPC .............. 464/68.1, 68.2, 38.6, 68.6; 192/201, 192/204, 213; 74/574.2  
See application file for complete search history.

(56) References Cited

U.S. PATENT DOCUMENTS

| 4,413,711 A * | 11/1983 | Lamarche ......... F16F 15/12353 192/213 |
| 4,585,427 A * | 4/1986 | Lamarche ........... F16F 15/1234 192/213 |

(Continued)

FOREIGN PATENT DOCUMENTS

| DE | 19642913 | 4/1997 |
| FR | 2492024 | 4/1982 |
| FR | 2605696 | 4/1988 |

*Primary Examiner* — Gregory Binda  
(74) *Attorney, Agent, or Firm* — Berenato & White, LLC

(57) ABSTRACT

A device (10) for damping torsion between a clutch element (16) and a transmission shaft, comprising: an input washer (12A, 12B) that is rotationally integral with the clutch element (16); two output webs (18A, 18B) that are rotationally integral with the transmission shaft by means of a central hub (20); a pair of circumferentially acting elastic members (42) that are interposed circumferentially in series between the input washer (12A, 12B) and the output web (18A, 18B); a phase washer (44) that is interposed circumferentially between the two elastic members (42) of said pair.

11 Claims, 5 Drawing Sheets

(56) References Cited

U.S. PATENT DOCUMENTS 8,096,885 B2 * 1/2012 MacDonald .......... F16F 15/123
  464/68.6 X 2010/0236228 A1 * 9/2010 Degler .................. F16F 15/145
  74/572.2 X
2010/0269497 A1 10/2010 Engelmann et al.

* cited by examiner

TORSION-DAMPING DEVICE COMPRISING TWO TORQUE OUTPUT PLATES ARRANGED ON EITHER SIDE OF TORQUE INPUT RING

CROSS-REFERENCE TO RELATED APPLICATIONS AND CLAIM TO PRIORITY

This application is a national stage application of International Application No. PCT/FR2013/050281 filed Feb. 12, 2013, which claims priority to French Patent Application No. 1251410 filed Feb. 16, 2012, of which the disclosures are incorporated herein by reference and to which priority is claimed.

FIELD OF THE INVENTION

The invention relates to a device for damping torsion between a clutch element and an automobile transmission shaft, comprising elastic members.

The invention relates more particularly to a device for damping torsion between a clutch element and a transmission shaft, the device having:
- at least one input washer that is rotationally integral with the clutch element around the axis of the transmission shaft;
- at least one output web that is rotationally integral with the transmission shaft by means of a central hub;
- at least one pair of circumferentially acting elastic members that are interposed circumferentially in series between the input washer and the output web;
- at least one phase washer that is mounted rotatably around the axis of the transmission shaft and is interposed circumferentially between the two elastic members of said pair.

BACKGROUND OF THE INVENTION

Damping devices of this kind are, for example, part of clutch installations such as hydrodynamic converters. A converter of this kind has, for example a rotating housing that is capable of transmitting driving torque to the damping device by means of a friction locking clutch, sometimes called a "lockup clutch." The converter also has a turbine wheel mounted rotatably inside the housing.

A combustion engine exhibits irregularities due to the succession of combustion events in the engine cylinders. Torsion damping means allow these irregularities to be filtered before driving torque is transmitted to a transmission. This is because the vibrations must be damped before they enter the transmission and produce unacceptably troublesome noise.

To accomplish this, it is known to interpose a torsion damping device between the engine shaft and the transmission shaft. The torsion damping device is generally arranged in a clutch system that allows temporary rotational connection of the engine shaft to the transmission shaft.

The torsion damping device generally has circumferentially acting elastic members that are interposed between a torque input element and a torque output element.

In so-called "long travel" damping devices, the elastic members are mounted, in groups of at least two elastic members, in series between the input element and output element.

In such a configuration, a phasing tab is interposed between the two elastic members of said group. This ensures that the elastic members work substantially in circumferential compression. The phasing tabs are, for example, carried by phase washers.

The input washers are generally arranged at the axial ends of the device in order to sandwich the output washers and the phase washer. A conventional design of this kind is evident because the output washers are coupled to the transmission shaft by means of a central hub, while the engine shaft is coupled to input washers via their periphery.

The torsion damper device also has two output webs that are arranged axially on either side of each input washer.

SUMMARY OF THE INVENTION

The present invention proposes a new design for a damping device of the type described above, in which the damping device is less burdensome to manufacture.

The invention proposes a damping device of the kind described previously, wherein the elastic members are arranged in series on the circumference of a single circle having an axis (B).

According to other characteristics of the invention:
- each input washer has a central orifice that is demarcated by an inner edge, the input washer being rotationally guided by sliding of its inner edge on a cylindrical guidance face that is rotationally integral with the central hub;
- the cylindrical guidance face is implemented integrally with the central hub;
- the guidance face has at least two radial stop faces, each of which is capable of interacting with an associated radial stop face that extends from the inner edge of the input washer in order to limit, in both directions, the rotation of the input washer with respect to the output web;
- the phase washer has a central orifice that is demarcated by an inner edge, the phase washer being rotationally guided by sliding of its inner edge on a cylindrical guidance face that is rotationally integral with the central hub;
- the phase washer and each input washer are rotationally guided by a common guidance face that is integral with the central hub;
- the guidance face has at least two radial stop faces, each of which is capable of interacting with an associated radial stop face that extends from the inner edge of the phase washer in order to limit, in both directions, the rotation of the phase washer with respect to the output web;
- the two radial stop faces of the guidance face are common to the phase washer and to each input washer;
- the two output webs are arranged axially on either side of each phase washer.

Also an object of the invention is a pendulum-type damping device intended to be part of the torsion damping device described above, wherein it has at least one pair of pendulum flyweights mounted oscillatingly in a radial plane on a peripheral ring of the phase washer.

BRIEF DESCRIPTION OF THE DRAWINGS

Other characteristics and advantages of the invention will become evident upon reading the detailed description that will follow, which will be understood by referring to the attached drawings in which.

DETAILED DESCRIPTION OF THE PREFERRED EMBODIMENT(S)

The following orientations will be used, in non-limiting fashion, for the description hereinafter:
- "axial": oriented from back to front along the rotation axis of the damping device, and indicated by arrow "A" of the Figures;
- "radial": oriented orthogonally to the axis of the damping device from inside to outside moving away from said axis;
- "circumferential": oriented orthogonally to the axis of the damping device and orthogonally to the radial direction.

For the remainder of the description, elements having similar, identical, or analogous functions will be labeled with the same reference numbers.

Figure 1:
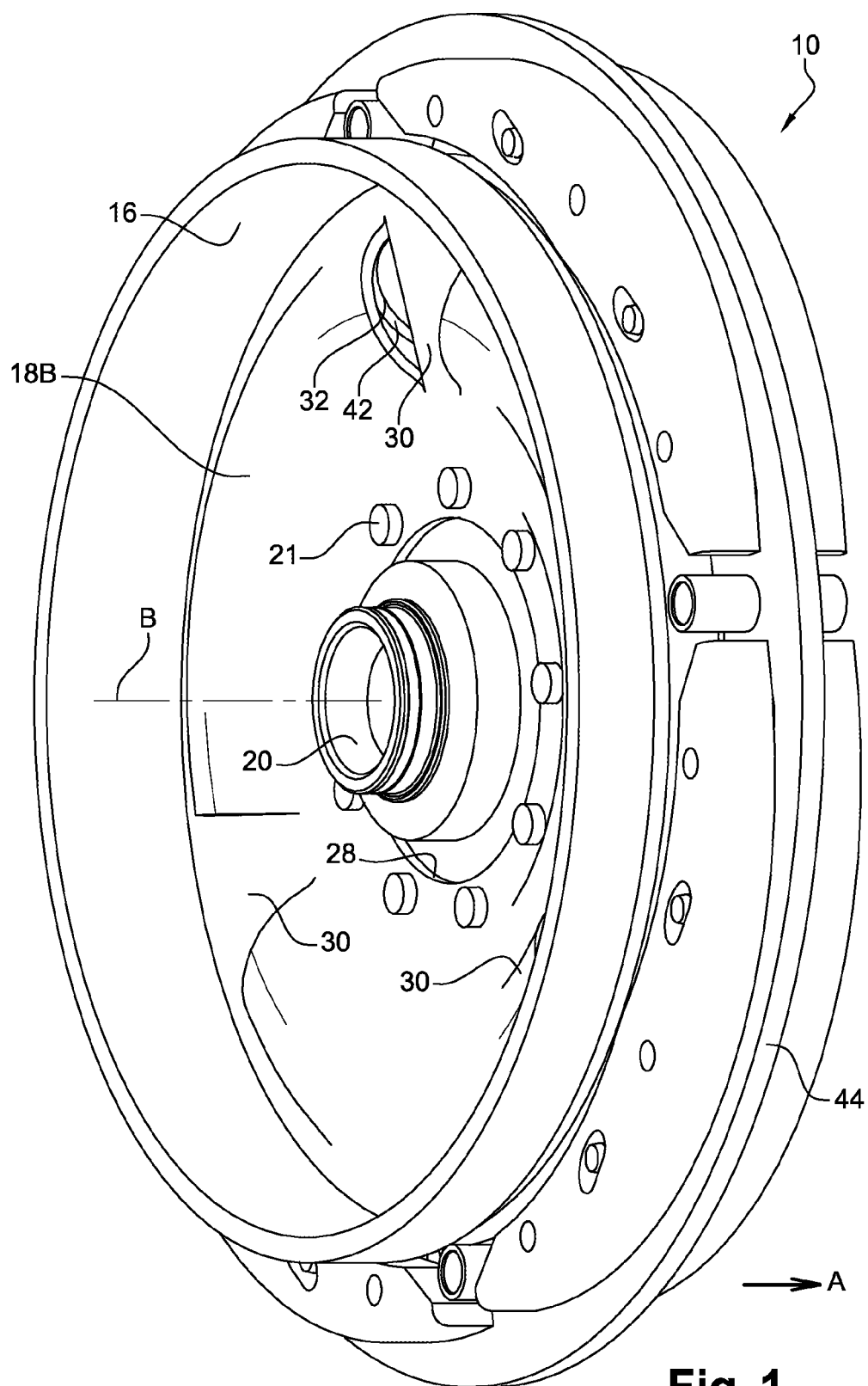
FIG. 1 is a perspective view depicting a damping device implemented according to the teaching of the invention.

FIG. 1 depicts a torsion damping device 10 implemented according to the teaching of the invention. Damping device 10 is intended to be arranged in an automotive temporary coupling system.

Damping device 10 is more particularly intended to be arranged in a hydrodynamic torque converter (not depicted) for coupling the torque converter housing, with torsion damping, to an input shaft of an automatic transmission.

Damping device 10 also advantageously allows a converter turbine wheel to be coupled, with torsion damping, to the input shaft of the automatic transmission.

Torsion damping device 10 allows stresses to be damped between a first, engine shaft (not depicted) and a second, transmission shaft (not depicted) that are coaxial with axis B, with torsional damping.

Figure 2:
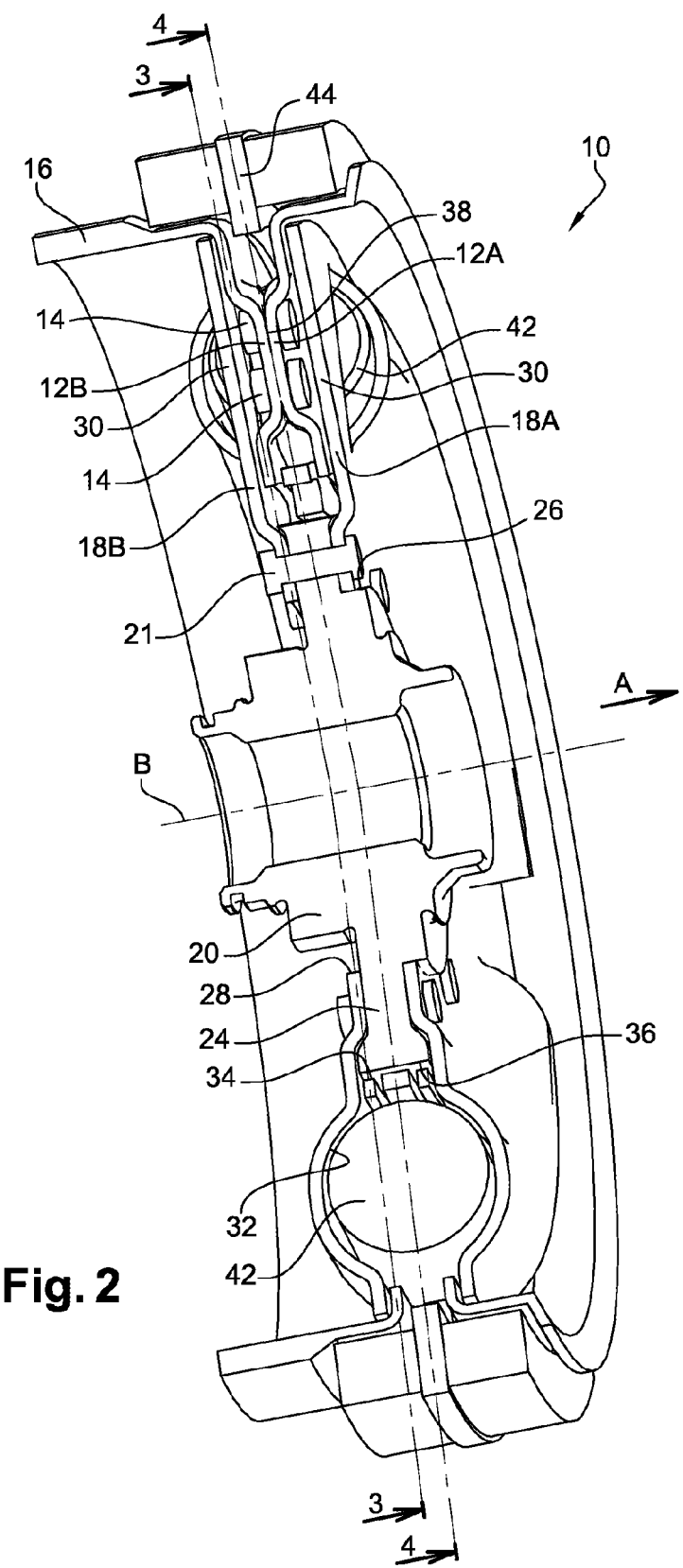
FIG. 2 is an axial section depicting the damping device of FIG. 1.

As depicted in FIGS. 1 and 2, damping device 10 has a torque input element that is constituted here by a first, front radial input washer 12A and by a second, rear radial input washer 12B. Washers 12A, 12B are parallel to one another.

Rear input washer 12B is rotationally connected to front input washer 12A by means of axial rivets 14, as depicted in FIG. 2.

The two input washers 12A, 12B are rotationally connected to the first, engine shaft by means of an internally splined skirt 16. Skirt 16 is an element of a locking clutch that is capable of temporarily coupling the converter housing to the transmission input shaft by means of torsion damping device 10. A locking clutch of this kind, sometimes also called a "lockup" clutch, is well known and will not be described in further detail.

Skirt 16 is rotationally integral with rear input washer 12B around rotation axis B.

Skirt 16 is implemented here integrally with rear input washer 12B. Skirt 16 extends axially to the rear from an outer peripheral edge of rear input washer 12B.

Damping device 10 also has two torque output elements that are constituted here by two radial output webs 18A, 18B: a first, front web 18A and a second, rear web 18B. Each output web 18A, 18B is in the shape of a circular washer coaxial with axis B.

Output webs 18A, 18B are intended to be rotationally connected to the second, driven shaft by means of a central hub 20. Output webs 18 are rotationally connected to central hub 20 by means of rivets 21.

More particularly, central hub 20 has a collar 24 that extends radially outward from a cylindrical face 26 of central hub 20. Webs 18A, 18B have central orifices 28 for passage of the driven shaft. Webs 18A, 18B axially surround collar 24. Rivets 21 thus allow central hub 20 and the two webs 18A, 18B to be fastened together.

Front web 18A is centered on central hub 20 by contact between the edge of its central orifice 28 and cylindrical face 26 of central hub 20.

Each output web 18A, 18B has three radial output tabs 30, one of which is visible in FIG. 1. Output tabs 30 are arranged regularly around axis B, globally at 120° from one another. Each output tab 30 circumferentially delimits a receptacle 32 of circular-arc shape as visible in FIG. 2.

Each of the three receptacles 32 is formed here by a concave deformation of web 18A, 18B, so that receptacle 32, thus axially demarcated between the two webs 18A, 18B, has the shape of a torus segment.

Output webs 18A, 18B are arranged axially on either side of the two input washers 12A, 12B. When the two output webs 18A, 18B are assembled, they are spaced apart by an axial distance sufficient to allow input washers 12A, 12B to rotate between the two output webs 18A, 18B without rubbing.

Skirt 16 extends radially around rear web 18B so that it extends axially protrudingly toward the rear with respect to rear web 18B.

Each input washer 12A, 12B has a radial flange that is provided with a central orifice to allow passage of central hub 20. The central orifice is demarcated radially by an inner edge 34.

Figure 3:
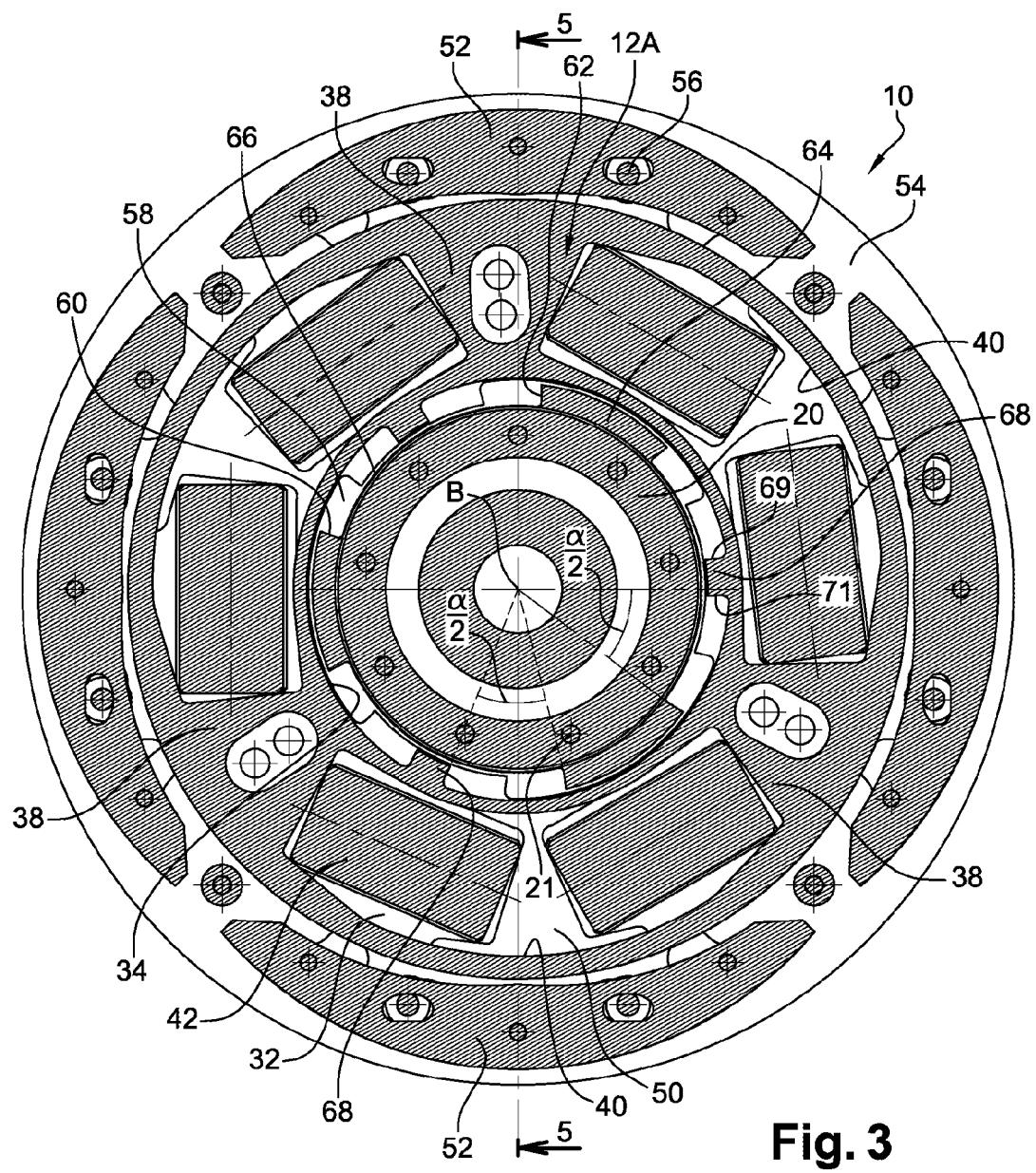
FIG. 3 is a cross-sectional view along section plane 3-3 of FIG. 2, depicting in particular an input washer.

More particularly, washers 12A, 12B are rotationally guided with respect to hub 20 by sliding of their inner edge 34 on segment 36 of collar 24, as illustrated in FIG. 3. Segment 36 of collar 24 thus forms a cylindrical guidance face 36 that is rotationally integral with central hub 20 of output webs 18A, 18B.

The axial thickness of guidance face 36 is at least equal to the cumulative thickness of the two input washers 12A, 12B.

Each input washer 12A, 12B furthermore has three input tabs 38 that are arranged in register with output tabs 30 of output web 18. One of the input tabs 38 of each input washer 12A, 12B is depicted in FIG. 2.

Referring to FIG. 3, tabs 38 of input washers 12A, 12B circumferentially demarcate three circular-arc windows 40 of said input washers 12A, 12B. Windows 40 are thus arranged in register with receptacles 32 of output webs 18A, 18B.

Two tabs 38 in register with each input washer 12A, 12B are thus arranged axially between two tabs 30 of output webs 18A, 18B, as is visible in FIG. 2. Tabs 38 in register with input washers 12A, 12B are here in direct axial contact with one another. In this configuration it is advantageous to arrange the fastening rivets 14 of the two input washers 12A, 12B on tabs 30.

Damping device 10 furthermore has circumferentially acting elastic members 42. Elastic members 42 here are identical to one another.

In non-limiting fashion, damping device 10 here has six elastic members, as is visible in FIG. 3. Elastic members 42 are constituted by helical springs having a principal axis oriented circumferentially.

As is visible in FIG. 3, elastic members 42 are arranged in series on the circumference of the same circle of axis B.

Elastic members 42 are divided into three pairs. The elastic members 42 of each pair are interposed circumferentially in series, i.e. end to end, between a tab 38 of input washers 12A, 12B and an output tab 30 of output webs 18A, 18B. The two elastic members 42 of each pair are thus received in one common associated receptacle 32.

The axial spacing between the tabs 30 in register with the two output webs 18A, 18B is less than the diameter of elastic members 42. Each elastic member 42 is thus kept axially and radially in position by receptacles 32 demarcated by the two output webs 18A, 18B.

Since the two elastic members of each pair are mounted in series, a downstream end face of an upstream elastic member 42 is capable of becoming braced against the upstream face of the other downstream elastic member 42 during transmission of a torque between input washers 12A, 12B and output webs 18A, 18B.

Figure 4:
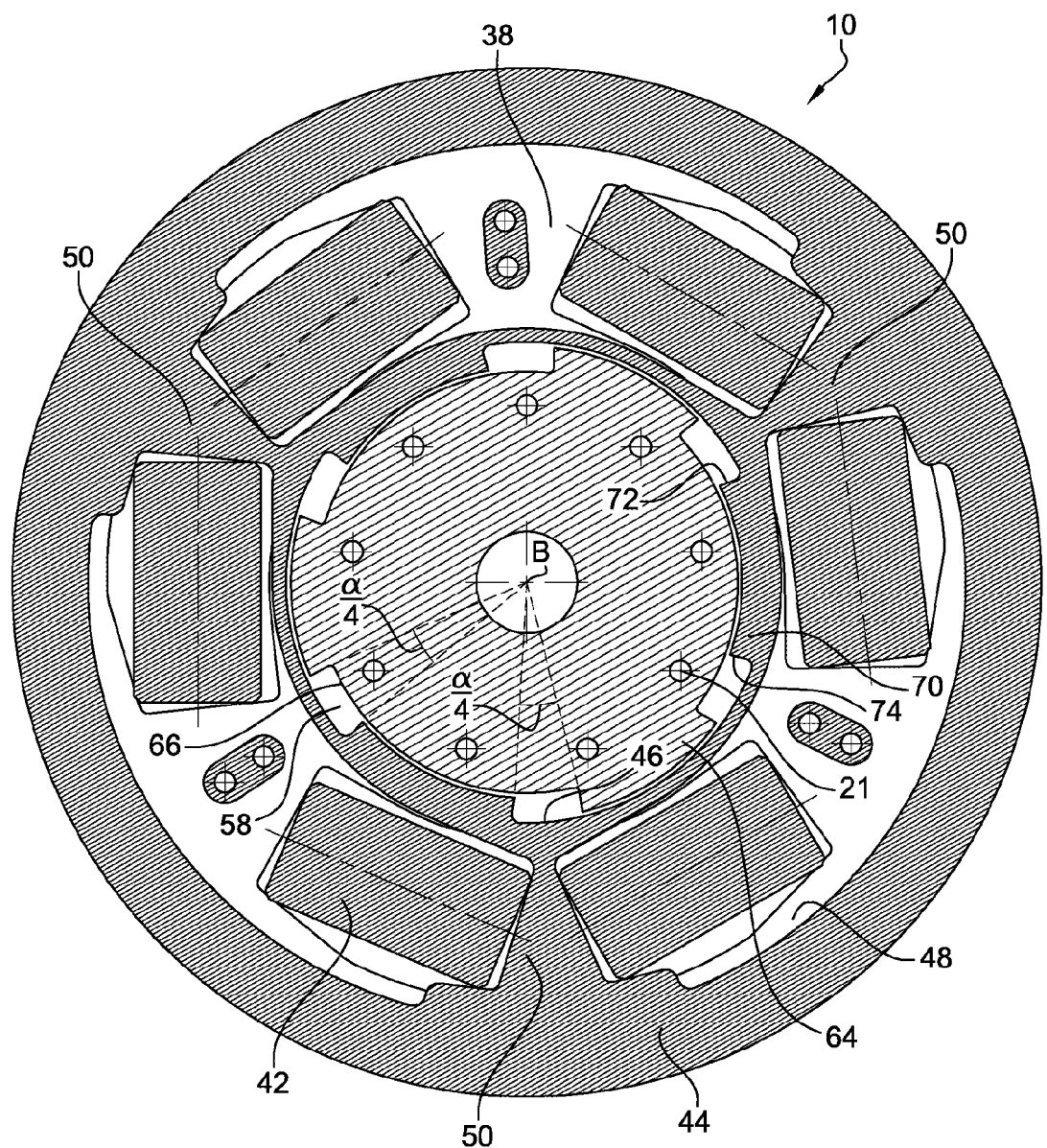
FIG. 4 is a sectioned view along section plane 4-4 of FIG. 2, depicting in particular a phase washer.
Figure 5:
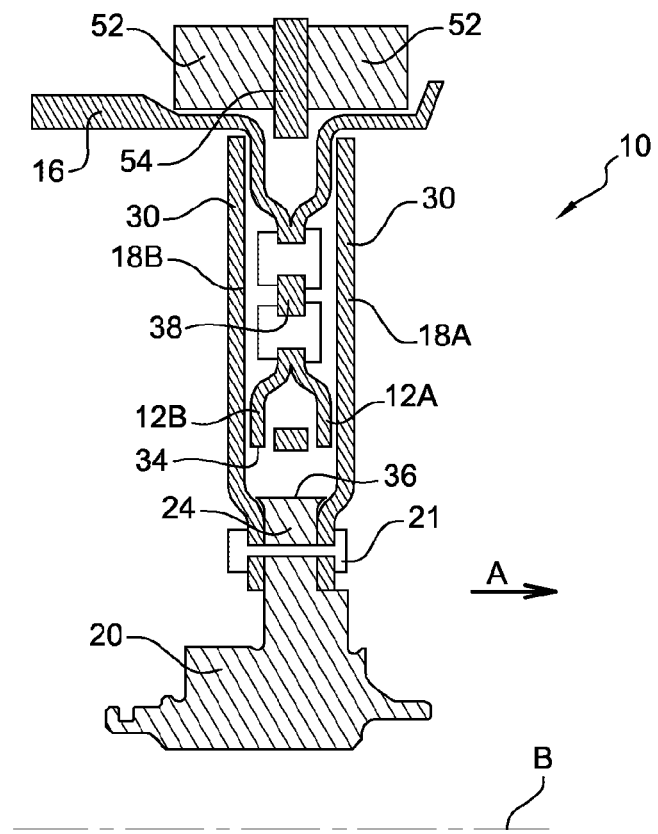
FIG. 5 is an axial sectioned view along section plane 5-5 of FIG. 3.
Figure 5:
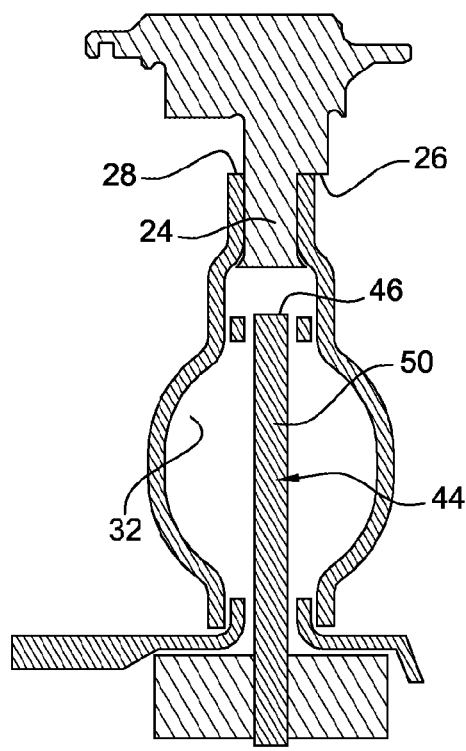

In order for elastic members 42 to be loaded substantially along their principal circumferential axis, it is known to equip damping device 10 with a phasing member. For this purpose, and as illustrated by FIGS. 4 and 5, device 10 also has a phase washer 44 that is mounted rotatably around axis B of the transmission shaft. Phase washer 44 is free to rotate with respect to input washers 12A, 12B and with respect to output webs 18A, 18B.

Phase washer 44 is in the shape of a radial disk that is equipped with a central orifice. Said central orifice is demarcated radially by an inner edge 46 of phase washer 44.

Phase washer 44 is arranged axially between the two input washers 12A, 12B.

The phase washer is rotationally guided by sliding of inner edge 46 on segment 36 of central hub 20.

Phase washer 44 is perforated by three circular-arc windows 48. Each window 48 is intended to accommodate two elastic members 42. Windows 48 are separated circumferentially from one another by three phase tabs 50. Phase tabs 50 are arranged between two elastic members 42 of one pair. In other words, each tab 38 of input washers 12A, 12B is arranged substantially in the middle of windows 48 of phase washer 44.

Each phase tab 50 is thus interposed circumferentially between the two elastic members 42 of each pair, so as to transmit circumferential forces from one elastic member 42 of each pair to the other elastic member 42 of said pair.

A downstream end face of each first upstream elastic member 42 of a pair is thus capable of loading or being loaded by an upstream radial face of the associated phase washer 50, while the upstream end face of the other downstream elastic member of the pair is capable of being loaded by or loading an opposite radial face of the associated phase tab 50, in such a way that the two elastic members 42 of the pair are mounted in series by means of phase washer 44.

When damping device 10 is in operation, elastic members 42 of each pair are compressed between tabs 38 of input washers 12A, 12B and tabs 30 of output webs 18A, 18B so as to damp abrupt changes in torque. Input washers 12A, 12B are capable of rotating through a defined maximum angle α around axis B with respect to output webs 18A, 18B, causing compression of the two elastic members 42 of each pair. Phase tabs 50 of phase washer 44 transmit compressive force from one elastic member 42 of the pair to the other. As a result of this compression, phase washer 44 is capable of rotating through half the defined angle α with respect to output webs 18A, 18B.

Damping device 10 is equipped here with secondary, pendulum-type torsion damping means. Second damping means of this kind have at least one pair, here four pairs, of pendulum flyweights 52 that are mounted oscillatingly in a radial plane on a peripheral ring 54 of phase washer 44.

The two pendulum flyweights 52 of one pair are arranged axially oppositely from one another.

As depicted in FIG. 2, the two pendulum flyweights 52 of the pair are mounted oscillatingly on phase washer 44 by means of axial securing pegs 56, visible in FIG. 3, that are received slidingly in an oblong guidance orifice of phase washer 38. Mounting in this fashion is well known and will not be described in further detail below.

Flyweights 52 are thus subjected to a maximum centrifugal force during the rapid rotation of damping device 10.

As depicted in FIG. 3, each pendulum flyweight 52 is in the shape of a plate that extends in a radial plane. Each pendulum flyweight 52 is curved in a circular arc that extends over an angle of a little less than 90°, so that the outer contour of each pendulum flyweight 52 conforms to the outer peripheral edge of phase washer 44.

Pendulum flyweights 52 of one pair are arranged axially on either side of peripheral ring 54.

In the example depicted in FIGS. 2 and 3, damping device 10 has four pairs of pendulum flyweights 52 that are distributed regularly along peripheral ring 54 of phase washer 44. Pendulum weights 52 are arranged in a circle around rotation axis B. Damping device 10 is thus balanced.

Damping device 10 also has means for limiting the angular deflection of washers 12A, 12B with respect to output webs 18A, 18B, which are visible in particular in FIGS. 3 and 4. This makes it possible, in particular, to prevent elastic members 42 from being damaged in the context of excessively rapid angular acceleration.

For this purpose, segment 36 of collar 24 of central hub 20 is equipped with notches 58, three in number here, that are distributed regularly around rotation axis B. Each notch is delimited circumferentially by an upstream radial face 60 and a downstream radial face 62. Notches 58 are thus separated circumferentially by protrusions 64 forming an angular sector of collar 24.

Each notch 58 is demarcated radially inwardly by a bottom 66. Bottoms 66 of the three notches 58 form a sector of a common cylindrical surface having an axis B.

Each protrusion 64 forms one sector of the outer cylindrical face of collar 24.

As depicted more specifically in FIG. 3, at least one of input washers 12A, 12B, here both of them, has three teeth 68 that extend radially inward from its inner edge 34. Teeth 68 are distributed regularly around rotation axis B. Each tooth 68 is demarcated circumferentially by two radial faces 69, 71.

Each tooth 68 is thus intended to be received in an associated notch 58. Guidance face 36 of collar 24 thus has two radial stop faces 60, 62, each of which is capable of interacting with an associated radial stop face 69, 71 of tooth 68 of input washer 12A, 12B in order to limit the rotation, in both directions, of input washer 12A, 12B with respect to output webs 18A, 18B.

As depicted in FIG. 3, the circumferential clearance between tooth 68 and the two radial faces 60, 62 of notch 58 is such that it allows an angular deflection of half the defined maximum angle α, in both directions, of input washers 12A, 12B with respect to output webs 18A, 18B.

Each tooth 68 has a radial height less than the depth of the associated notch 58, so that a radial rotational clearance remains between the top of tooth 68 and bottom 66 of notch 58. Rotational guidance of input washers 12A, 12B is thus implemented only by the sliding of inner edge 34 of input washers 12A, 12B on outer cylindrical face 36 of collar 24. In this configuration, the guidance surface of input washers 12A, 12B is maximal.

As a variant, the teeth have a radial height greater than the depth of the notch, so that the radial rotational clearance is confined between the outer face of the protrusions and the inner edge of the input washers. In this configuration, the guidance surface of the input washers is minimal.

As depicted in FIG. 4, limitation of the angular deflection of phase washer 44 with respect to output webs 18A, 18B is implemented analogously.

Phase washer 44 thus has three teeth 70 that extend radially inward from its inner edge 46. Teeth 70 are distributed regularly around rotation axis B. Each tooth 70 is demarcated circumferentially by two radial faces 72, 74.

Each tooth 70 is thus intended to be received in an associated notch 58. Guidance face 36 of collar 24 thus has two radial stop faces 60, 62, each of which is capable of interacting with an associated radial stop face 72, 74 of tooth 70 of phase washer 44 in order to limit, in both directions, the rotation of phase washer 44 with respect to output webs 18A, 18B.

As depicted in FIG. 4, the circumferential clearance between tooth 70 and the two radial faces 60, 62 of notch 58 is such that it allows an angular deflection of one-quarter of the defined maximum angle α, in both directions, of phase washer 44 with respect to output webs 18A, 18B.

Each tooth 70 has a radial height less than the depth of the associated notch 58, so that a radial rotation clearance remains between the top of tooth 70 and bottom 66 of notch 58. Rotational guidance of phase washer 44 is thus implemented only by the sliding of inner edge 46 of phase washer 44 on outer cylindrical face 36 of collar 24. In this configuration, the guidance surface of phase washer 44 is maximal.

As a variant, the teeth have a radial height greater than the depth of the notch, so that the radial rotational clearance is confined between the outer face of the protrusions and the inner edge of the phase washer. In this configuration, the guidance surface of the phase washer is minimal.

A configuration of this kind is very advantageous, since faces 60, 62 of notches 58 form common angular stops for phase washer 44 and input washers 12A, 12B.

It is thus not necessary to provide individual stop elements in order to limit the angular deflections of phase washer 44 with respect to output webs 18A, 18B, and of input washers 12A, 12B with respect to output webs 18A, 18B.

The invention claimed is:

1. A device (10) for damping torsion between a clutch element (16) and a transmission shaft, the device (10) comprising:
    an input washer (12A, 12B) that is rotationally integral with the clutch element (16) around the axis (B) of the transmission shaft;
    an output web (18A, 18B) that is rotationally integral with the transmission shaft by means of a central hub (20);
    at least one pair of circumferentially acting elastic members (42) that are interposed circumferentially in series between the input washer (12A, 12B) and the output web (18A, 18B);
    at least one phase washer (44) that is mounted rotatably around the axis (B) of the transmission shaft and is interposed circumferentially between the two elastic members (42) of said pair,
    said output web comprising a pair of output web elements (18A, 18B) that are arranged axially on either side of the input washer (12A, 12B), and wherein each input washer (12A, 12B) has a central orifice that is demarcated by an inner edge (34), the input washer (12A, 12B) being rotationally guided by sliding of its inner edge (34) on a cylindrical guidance face (36) that is rotationally integral with the central hub (20), said guidance face (36) having at least two radial stop faces (60, 62), each of which is capable of interacting with an associated radial stop face (69, 71) that extends from the inner edge (34) of the input washer (12A, 12B) in order to limit, in both directions, the rotation of the input washer (12A, 12B) with respect to the output web (18A, 18B), and
    wherein the elastic members (42) are arranged in series on the circumference of a single circle having an axis (B).

2. The device (10) according to claim 1, wherein the cylindrical guidance face (36) is implemented integrally with the central hub (20).

3. The device (10) according to claim 1, wherein the phase washer (44) has a central orifice that is demarcated by an inner edge (46), the phase washer (44) being rotationally guided by sliding of its inner edge (46) on a cylindrical guidance face (36) that is rotationally integral with the central hub (20).

4. The device (10) according to claim 3, wherein the phase washer (44) and each input washer (12A, 12B) are rotationally guided by a common guidance face (36) that is integral with the central hub (20).

5. The device (10) according to claim 3, wherein the guidance face (36) has at least two radial stop faces (60, 62), each of which is capable of interacting with an associated radial stop face (72, 74) that extends from the inner edge (46) of the phase washer (44) in order to limit, in both directions, the rotation of the phase washer (44) with respect to the output web (18A, 18B).

6. The device (10) according to claim 5, wherein the two radial stop faces (60, 62) of the guidance face (36) are common to the phase washer (44) and to each input washer (12A, 12B).

7. The device (10) according to claim 6, wherein the two output web elements (18A, 18B) are arranged axially on either side of each phase washer (44).

8. A torsion damping device according to claim 1, further comprising a pendulum type damping device including at least one pair of pendulum flyweights mounted oscillatingly in a radial plane on a peripheral ring of the phase washer (44).

9. A device (10) for damping torsion between a clutch element (16) and a transmission shaft, the device (10) comprising:
    an input washer (12A, 12B) that is rotationally integral with the clutch element (16) around the axis (B) of the transmission shaft;
    an output web (18A, 18B) that is rotationally integral with the transmission shaft by means of a central hub (20);
    at least one pair of circumferentially acting elastic members (42) that are interposed circumferentially in series between the input washer (12A, 12B) and the output web (18A, 18B);
    at least one phase washer (44) that is mounted rotatably around the axis (B) of the transmission shaft and is interposed circumferentially between the two elastic members (42) of said pair,
    said output web comprising a pair of output web elements (18A, 18B) that are arranged axially on either side of the input washer (12A, 12B), and wherein the phase washer (44) has a central orifice that is demarcated by an inner edge (46), the phase washer (44) being rotationally guided by sliding of its inner edge (46) on a cylindrical guidance face (36) that is rotationally integral with the central hub (20), the phase washer (44) and the input washer (12A, 12B) are rotationally guided by a common guidance face (36) that is integral with the central hub (20), and
    wherein the elastic members (42) are arranged in series on the circumference of a single circle having an axis (B).

10. A device (10) for damping torsion between a clutch element (16) and a transmission shaft, the device (10) comprising:

an input washer (12A, 12B) that is rotationally integral with the clutch element (16) around the axis (B) of the transmission shaft;

an output web (18A, 18B) that is rotationally integral with the transmission shaft by means of a central hub (20);

at least one pair of circumferentially acting elastic members (42) that are interposed circumferentially in series between the input washer (12A, 12B) and the output web (18A, 18B);

at least one phase washer (44) that is mounted rotatably around the axis (B) of the transmission shaft and is interposed circumferentially between the two elastic members (42) of said pair, said input washer comprising a pair of input washers (12A, 12B)

said output web comprising a pair of output web elements (18A, 18B) that are arranged axially on either side of input washers (12A, 12B), and wherein the phase washer (44) is arranged axially between the two input washers (12A, 12B), and wherein the elastic members (42) are arranged in series on the circumference of a single circle having an axis (B).

11. A torsion damping device according to claim 10, further comprising a pendulum type damping device including at least one pair of pendulum flyweights mounted oscillatingly in a radial plane on a peripheral ring of the phase washer (44).

\* \* \* \* \*